United States Patent
Slat

[19]

[11] Patent Number: 5,772,056
[45] Date of Patent: Jun. 30, 1998

[54] PLASTIC BLOW MOLDED CONTAINER

[75] Inventor: William A. Slat, Brooklyn, Mich.

[73] Assignee: Plastipak Packaging, Inc., Plymouth, Mich.

[21] Appl. No.: 653,485

[22] Filed: May 24, 1996

[51] Int. Cl.[6] .............................. B65D 1/02; B65D 23/02
[52] U.S. Cl. ........................ 215/12.2; 215/12.1; 215/375
[58] Field of Search .................................. 215/12.1, 12.2, 215/375

[56] References Cited

U.S. PATENT DOCUMENTS

| | | |
|---|---|---|
| 3,717,544 | 2/1973 | Valyl . |
| 3,719,735 | 3/1973 | Valyi . |
| 3,878,282 | 4/1975 | Bonis et al. . |
| 4,067,944 | 1/1978 | Valyi . |
| 4,174,413 | 11/1979 | Yasuike et al. . |
| 4,289,817 | 9/1981 | Valyi . |
| 4,307,137 | 12/1981 | Ota et al. . |
| 4,391,861 | 7/1983 | Nilsson . |
| 4,646,925 | 3/1987 | Nohara . |
| 4,764,403 | 8/1988 | Ajmera .............................. 215/12.2 X |
| 4,808,482 | 2/1989 | Benge et al. . |
| 4,925,711 | 5/1990 | Akao et al. . |
| 4,999,254 | 3/1991 | Ofstein . |
| 5,049,449 | 9/1991 | Ofstein . |
| 5,064,080 | 11/1991 | Young et al. . |
| 5,064,724 | 11/1991 | Ofstein . |
| 5,102,705 | 4/1992 | Yammoto et al. . |
| 5,139,162 | 8/1992 | Young et al. . |
| 5,287,978 | 2/1994 | Young et al. . |
| 5,443,766 | 8/1995 | Slat et al. . |
| 5,464,106 | 11/1995 | Slat et al. . |

*Primary Examiner*—Sue A. Weaver
*Attorney, Agent, or Firm*—Brooks & Kushman P.C.

[57] ABSTRACT

A plastic blow molded container (10) and method for making the container with a hollow body portion (11), an upper dispensing end (14), and a lower freestanding base (18). The container (10) is biaxially oriented and has an outer layer (19) and an inner liner (20). The inner liner (20), which is a virgin resin having a nominal wall thickness that is less than 0.25 of the total wall thickness of the container, and the outer layer (19) is post consumer recycled, green colored polyethylene terephthalate. The virgin resin of the inner liner (20), which is preferably polyethylene terephthalate, polyethylene naphthalate or blends thereof with each other or with other resins, is extruded and then blow molded to form an inner liner about which the post consumer recycled, green colored polyethylene terephthalate is injection molded to provide the outer layer.

2 Claims, 3 Drawing Sheets

PLASTIC BLOW MOLDED CONTAINER

TECHNICAL FIELD

This invention relates to a plastic blow molded container and also relates to a method for making the container.

BACKGROUND ART

Plastic blow molding of containers is conventionally performed by providing a hot plastic parison either from extruded plastic or as a preform which is usually injection molded from plastic. Usually, such preforms are composed of a single type of plastic that is injected into a mold through a single port. However, there have also been attempts to provide coinjection of more than one plastic into a mold so as to provide different layers of plastic.

U.S. Pat. No. 3,878,282 to Bonis et al. discloses a process for moldeng multi-layer articles that are specifically disposed as a preform-type parison with different layers. The process involved is performed by injection molding the different layers within different molds while mounted on the same inner mandrel during the injection of each layer.

U.S. Pat. No. 4,307,137 to Ota et al. discloses a method for forming an optical design pattern in polyethylene terephthalate articles which are specifically disclosed as a blow molding preform having inner and outer members with the inner member having an open end defining a thread closure and with the outer member having a junction with the inner member toward a closed end of the preform from the thread closure.

U.S. Pat. No. 4,391,861 to Nilsson discloses a preform of a thermoplastic and has a two-part interfitted construction and at least one intermediate layer that functions as a gas barrier, and also discloses that the outer part may be previously used and reprocessed material.

U.S. Pat. No. 4,646,925 to Nohara discloses a multi-layer preform for draw-blow forming a bottle which has inner and outer layers with a junction that is located toward a closed end of the preform from a closure thread at an open end of the preform. The preform also includes a gas barrier intermediate the inner and outer layers.

U.S. Pat. No. 5,102,705 discloses a bottle made of polyethylene naphthalate resin produced by highly stretching a preform in a manner that is disclosed as limiting gas permeability and x-ray transmission.

Reusable glass bottles for holding pressurized beverages have been substantially replaced by plastic blow molded bottles. Such plastic blow molded bottles were initially manufactured with a hemispherically shaped lower end so as to withstand the internal pressure involved, and this lower end was received within an injection molded base cup for supporting the bottle. More recently, such plastic blow molded containers have been manufactured with freestanding base structures such as disclosed by U.S. Pat. Nos. 5,064,080 Young et al, 5,139,162 Young et al and 5,287,978 Young et al.

U.S. Pat. Nos. 3,717,544 Valyl, 3,719,735 Valyl and 4,067,944 Valyl disclose multi-layer blow molded containers made from preforms having an inner layer provided by a liner about which an outer layer is formed by injection molding. The 3,717,544 Valyl patent discloses the liners as being made by a thermoforming process wherein a vacuum is applied to a female mold to deform a heated plastic sheet to the shape of the mold.

U.S. Pat. No. 5,443,766 Slat et al discloses a multi-layer preform used for plastic blow molding and provided with an inner layer of polyethylene naphthalate that is thermoformed to function as a gas barrier.

U.S. Pat. No. 5,464,106 Slat et al discloses a multi-layer preform having an inner liner that is extruded and blow molded with an outer layer of a barrier material over which an injection molded outer layer is provided to form the multi-layer preform that is blow molded to provide a container.

Other multi-layer containers are disclosed by U.S. Pat. Nos. 4,174,413 Yasuike et al and 4,289,817 Valyi.

Also, multi-layer plastic sheets are disclosed by U.S. Pat. Nos.: 4,808,482 Benge et al; 4,925,711 Akao et al; 4,999,254 Ofstein; 5,049,449 Ofstein; and 5,064,724 Ofstein.

To date, post consumer recycled plastic resin that is colored, most of which is green in color, has been utilized only to make carpet backing and strapping used in packaging.

DISCLOSURE OF INVENTION

One object of the present invention is to provide an improved plastic blow molded container.

In carrying out the above object, the plastic blow molded container of the invention includes a hollow body portion that extends vertically and has upper and lower extremities. An upper dispensing end of the container is located above the upper extremity of the body portion and includes an upper dome extending inwardly and upwardly therefrom. The upper dispensing end also includes a dispensing spout that extends upwardly from the upper dome and has a closure retainer. A lower freestanding base of the container closes the lower extremity of the body portion and includes a central hub as well as hollow legs and curved ribs positioned around the hub in an alternating relationship such that the legs support the container in an upright position on a suitable support surface. The container is biaxially oriented and has an inner liner and an outer layer, with the inner liner being a virgin resin and having a nominal wall thickness that is less than 0.25 of the total wall thickness of the container, and with the outer layer being post consumer recycled, green colored polyethylene terephthalate.

In the preferred construction, the plastic blow molded container has the inner liner of virgin resin made from polyethylene terephthalate, blends of polyethylene terephthalate and other resins, polyethylene naphthalate, blends of polyethylene naphthalate and other resins, blends of polyethylene terephthalate and polyethylene naphthalate, or blends of polyethylene terephthalate and polyethylene naphthalate with other resins.

Another object of the present invention is to provide an improved method for making a plastic blow molded container.

In carrying out this further object of the invention, the method for making a plastic blow molded container is performed by forming an inner liner and in addition injection molding post consumer recycled, green colored polyethylene terephthalate to provide an outer layer for cooperating with the inner liner to provide a preform of an elongated shape with the inner liner having a nominal wall thickness that is less than 0.25 of the total wall thickness of the inner liner and the outer layer. Axial stretching and blow moldeng of the preform is then performed to provide a biaxially oriented, green colored container having a lower freestanding base including a central hub as well as hollow legs and curved ribs positioned around the hub in an alternating relationship.

In the preferred practice of the method for making a plastic blow molded container, the virgin resin is extruded and then blow molded to form the inner preform liner about which the post consumer recycled, green colored polyethylene terephthalate is injection molded to provide the outer layer. This preferred practice of the method for making a plastic blow molded container also has the inner liner extruded and then blow molded from virgin resin that is polyethylene terephthalate, blends of polyethylene terephthalate and other resins, polyethylene naphthalate, blends of polyethylene terephthalate and polyethylene naphthalate, or blends of polyethylene terephthalate and polyethylene naphthalate with other resins.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
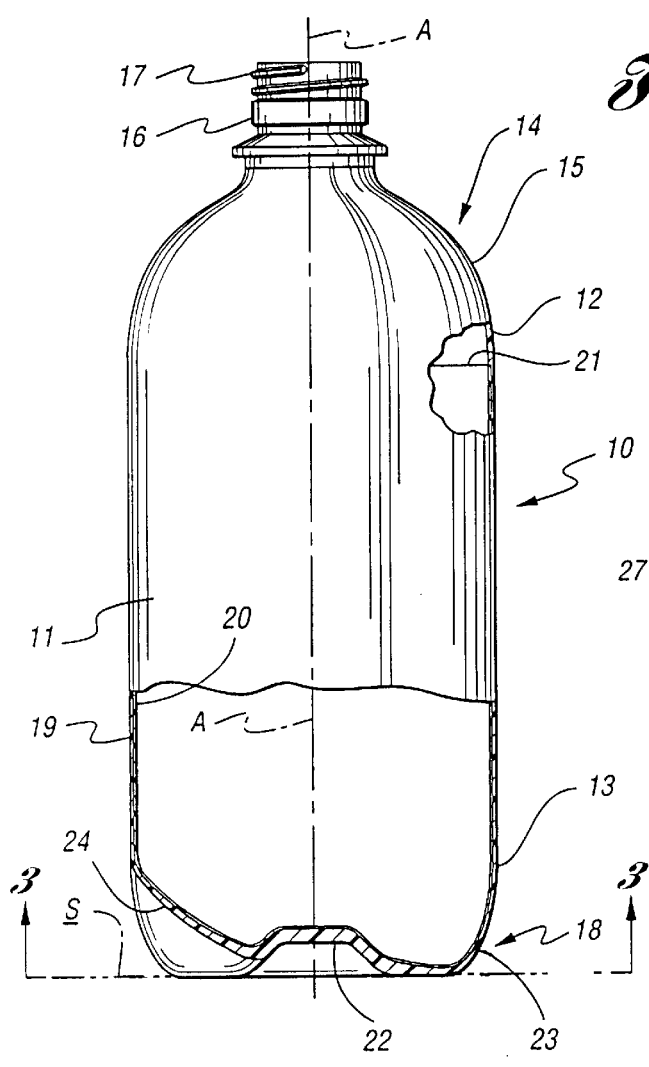
FIG. 1 is an elevational view partially broken away in section of a biaxially oriented plastic blow molded container of a multi-layer construction in accordance with the present invention.
Figure 3:
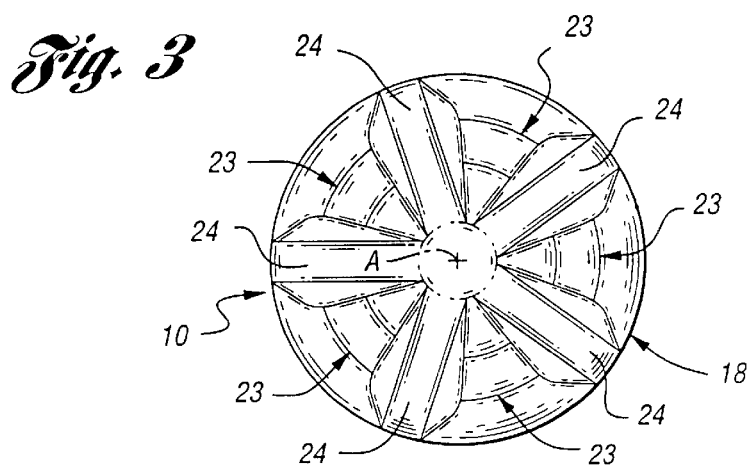
FIG. 3 is a bottom plan view of the container taken along the direction of line 3—3 in FIG. 1 to illustrate the construction of its lower freestanding base.

With reference to FIG. 1 of the drawings, a multi-layer blow molded container indicated by 10 is constructed in accordance with the present invention. The container 10 includes a hollow body portion 11 that has upper and lower extremities 12 and 13, respectively. This body portion 11 extends vertically between its upper and lower extremities with a round construction about a central vertical axis A as illustrated in FIG. 3. The container 10 has an upper dispensing end 14 located above the upper extremity 12 of the body portion 11 and including an upper dome 15 extending inwardly and upwardly therefrom with a generally hemispherical shape. The upper dispensing end 14 also includes a dispensing spout 16 that extends upwardly from the upper dome 15 and has a closure retainer 17 for securing an unshown closure cap that closes the container after its filling and that is unmoved to provide dispensing of the container contents through the open spout.

With reference to both FIGS. 1 and 3, a lower freestanding base 18 of the container closes the lower extremity 13 of the body portion 11 and supports the container in an upright position on a suitable horizontal support surface S.

Figure 6:
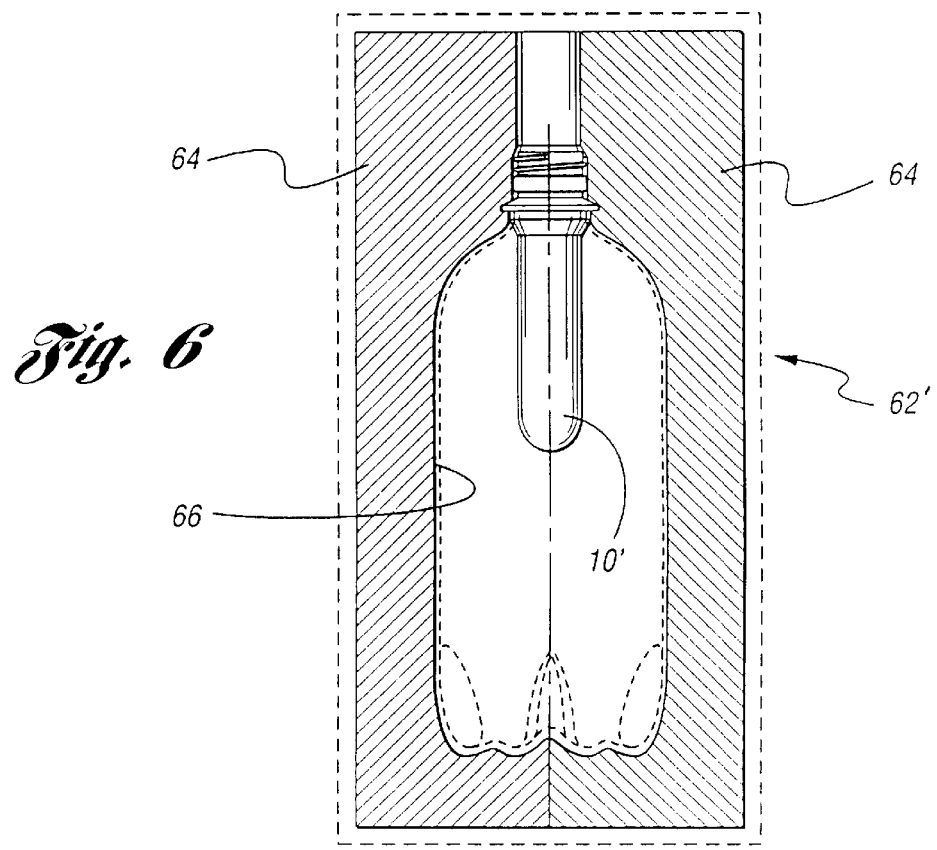
FIG. 6 is a sectional view taken through a mold in which the preform is blow molded to provide the container.

The container 10 is biaxially oriented by axial stretching of the preform 10' during the blow molding as is hereinafter more fully described in connection with FIG. 6. This preform 10 includes an outer layer 19 and an inner liner 20. The inner liner 20 is formed of a virgin resin and has a nominal wall thickness that is less than 0.25 of the total wall thickness of the container. The outer layer 19 is post consumer recycled, green colored polyethylene terephthalate.

In the preferred construction of the container 10, the inner liner 20 of virgin resin is made of either polyethylene terephthalate or polyethylene naphthalate. When the polyethylene naphthalate is utilized, enhanced gas barrier properties are provided by the inner liner as well as contacting the container contents with virgin resin so as to meet regulatory requirements. It is also possible for the inner liner 20 of virgin resin to be made of blends of polyethylene terephthalate or polyethylene naphthalate with other resins as well as the possibility of being made from a blend of polyethylene terephthalate and polyethylene naphthalate or from a blend of polyethylene terephthalate and polyethylene naphthalate with other resins.

The blow molding is performed to provide the freestanding base 18 with a construction that includes a central hub 22 and also includes hollow legs 23 and curved ribs 24 positioned around the hub in an alternating relationship such that the legs support the container upright on the support surface S and the ribs strengthen the base so that it is capable of withstanding internal pressure.

Most preferably, the inner liner 20 has a wall thickness that is in the range of about 0.05 to 0.15 of the adjacent wall thickness of the post consumer recycled, green colored polyethylene terephthalate outer layer 19. Specifically, the blow molded container 10 will normally have a wall thickness that is nominally twelve or thirteen thousandths of an inch thick and the inner liner 20 will have a thickness that is about 0.6 thousandths of an inch to 2 thousandths of an inch thick with the rest of the wall thickness being the outer layer 19 of post consumer recycled, green colored polyethylene terephthalate.

Figure 2:
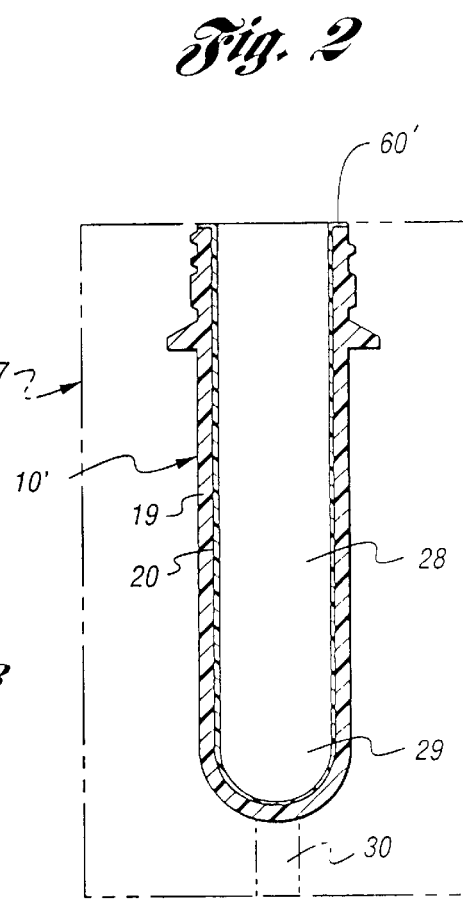
FIG. 2 is a partially broken away elevational view of a multi-layer preform that is constructed to provide blow molding of the container of this invention.

As is hereinafter more fully described, the inner liner 20 is initially extruded and blow molded in preparation for making the multi-layer preform 10' that is subsequently blow molded as container 10. The preform 10' is made by inserting the inner liner 20 as shown in FIG. 2 into an injection mold 27 having a core pin 28 whose distal end 29 is located adjacent the area of the preform that eventually becomes the central hub 22 of the freestanding base 18 of the container 10 shown in FIG. 1. The injection mold 27 has an injection port 30 through which the polyethylene terephthalate resin is injected to provide the outer main layer 19 adjacent the core pin distal end 29.

Inner liner 20 is preferably extruded via an extrusion process discussed below, and outer layer 19 is injection molded as discussed above to also form the threaded upper portion 12. As a result of the extrusion process, inner liner 20 can be controllably adjusted in thickness based upon the functions to be performed by the various portions comprising preform 10 and the container.

Variations in thickness of inner liner 20 are desirable for several reasons which include aesthetics, efficient material use and reduced costs, and variable strength requirements. Efficient material use is evident in inner liner 20 whose upper portion is thinnest. Strength considerations at its lower closed end require the inner liner 20 to be thickest at this location which eventually forms the base 18 whose construction is described above.

Figure 4:
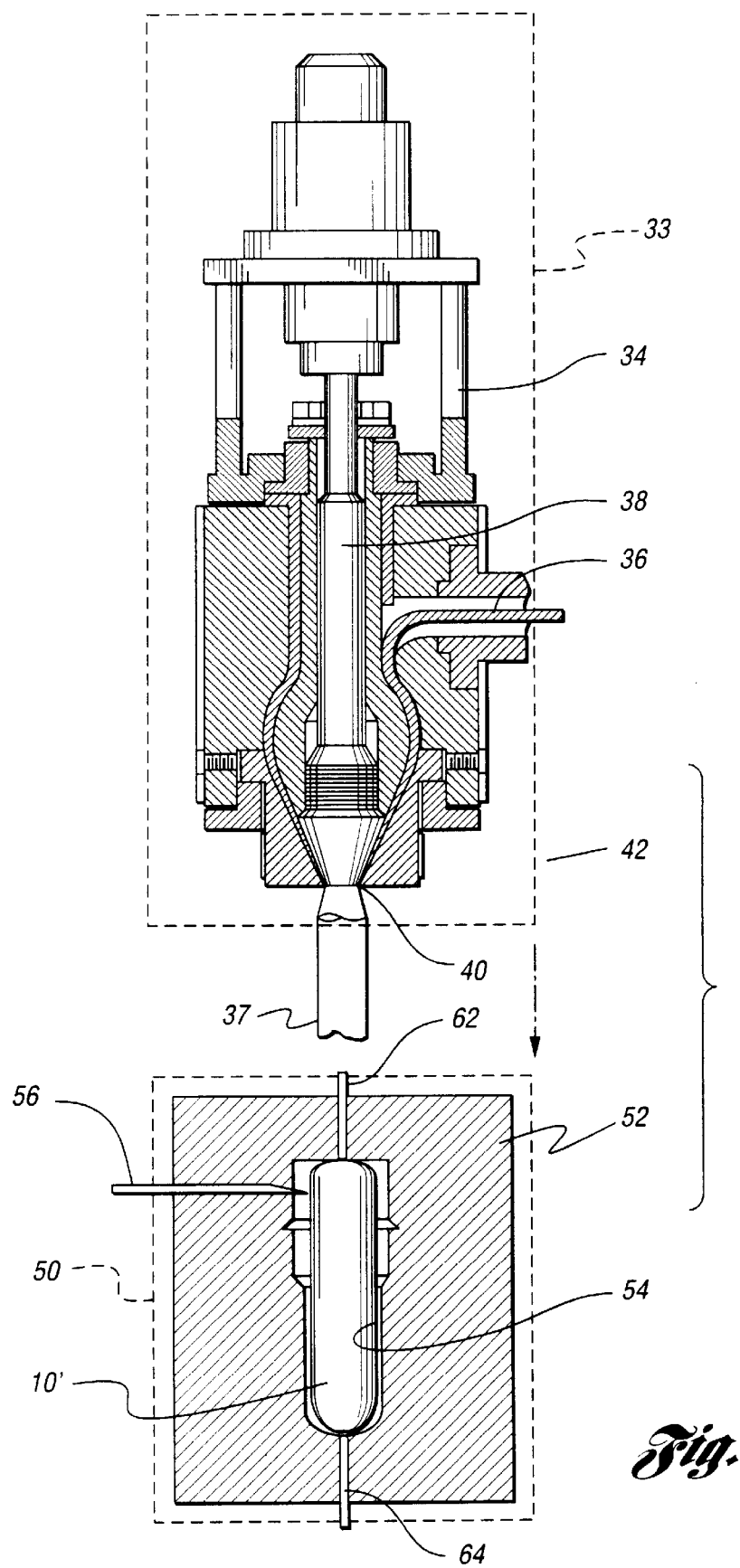
FIG. 4 is a schematic view illustrating extrusion of a parison that is blow molded to provide an inner liner for the preform.

With reference to FIG. 4, the preform inner liner 20 is initially formed by an extruder 33 having an extruder head 34. A melt 36 of virgin resin is formed into a substantially annular shape for extrusion as a tubular parison 37. Extruder 33 includes an adjuster 38 in the form of a die pin stem that is reciprocally movable in relationship to the annular extrusion opening 40 through which the melt 36 passes within the die bushing 42 to form the parison 37. Such movement controls the wall thickness of the extruded parison 37.

With continuing reference to FIG. 4 blow molding apparatus 50 includes a mold 52 that receives the extruded parison 37 of virgin resin in an open mold condition prior to closing as illustrated so that a mold cavity 54 encloses the parison. A blow pin 56 is inserted into the enclosed parison to provide blow molding thereof to the shape of the cavity.

Figure 5:
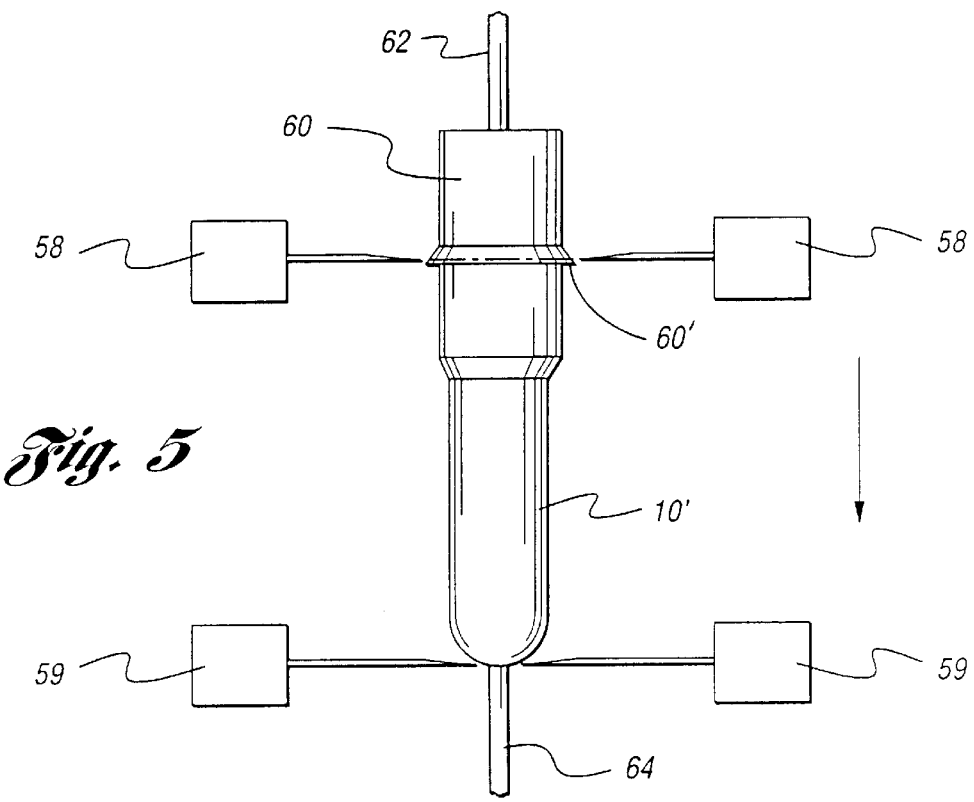
FIG. 5 is a view illustrating a cutting and trimming operation performed on the preform inner liner after its blow molding.

With reference to FIG. 5, the blow molded preform liner 10' is operated on by cutters 58 that remove an upper blow head 60 and associated flash 62 and by trimmers 59 that remove lower flash 64. It will be noted that the preform 10' has an upper annular flange 60' that extends over the top of the dispensing spout 16 after the injection molding of the completed preform 10' as previously described in connection with FIG. 2. This flange 60' ensures that the associated closure cap like the container contents contacts only virgin resin.

The completed preform 10' is positioned within a blow mold 62' whose mold sections 64 are moved to a closed position to define a cavity 66. Axially stretching of the preform 10' and blow molding then provides the container 10 previously descried in connection with FIG. 1.

While the best modes for carrying out the invention have been described in detail, those familiar with the art to which this invention relates will recognize various alternative ways for practicing the invention as defined by the following claims.

What is claimed is:

1. A plastic blow molded container comprising:

a hollow body portion that extends vertically and has upper and lower extremities;

an upper dispensing end located above the upper extremity of the body portion and including an upper dome extending inwardly and upwardly therefrom, and the upper dispensing end also including a dispensing spout that extends upwardly from the upper dome and has a closure retainer;

a lower freestanding base that closes the lower extremity of the body portion and includes a central hub as well as hollow legs and curved ribs positioned around the hub in an alternating relationship such that the legs support the container in an upright position on a suitable horizontal support surface; and the container being biaxially oriented and having an inner liner and an outer layer, the inner liner being a virgin resin and having a nominal wall thickness that is less than 0.25 of the total wall thickness of the container, and the outer layer being post consumer recycled, green colored polyethylene terephthalate.

2. A plastic blow molded container as in claim 1 wherein the inner liner of virgin resin is selected from the group consisting of polyethylene terephthalate, blends of polyethylene terephthalate and other resins, polyethylene naphthalate, blends of polyethylene naphthalate and other resins, blends of polyethylene terephthalate and polyethylene naphthalate, and blends of polyethylene terephthalate and polyethylene naphthalate with other resins.

* * * * *